United States Patent
Nicol et al.

(10) Patent No.: US 10,243,853 B2
(45) Date of Patent: Mar. 26, 2019

(54) ADAPTIVE ROUTING FOR LINK-LEVEL RETRY PROTOCOL

(71) Applicant: HEWLETT PACKARD ENTERPRISE DEVELOPMENT LP, Houston, TX (US)

(72) Inventors: Russell Leonard Nicol, Eau Claire, WI (US); Joseph Martin Placek, Chippewa Falls, WI (US); Mark Ronald Sikkink, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 87 days.

(21) Appl. No.: 15/357,479

(22) Filed: Nov. 21, 2016

(65) Prior Publication Data

US 2018/0145913 A1    May 24, 2018

(51) Int. Cl.
| | |
|---|---|
| *H04L 12/803* | (2013.01) |
| *H04L 12/707* | (2013.01) |
| *H04L 12/751* | (2013.01) |
| *G06F 13/16* | (2006.01) |
| *G06F 13/40* | (2006.01) |
| *G06F 13/42* | (2006.01) |

(52) U.S. Cl.
CPC ........ *H04L 47/122* (2013.01); *G06F 13/1673* (2013.01); *G06F 13/4022* (2013.01); *G06F 13/4282* (2013.01); *H04L 45/02* (2013.01); *H04L 45/22* (2013.01); *Y02D 10/14* (2018.01); *Y02D 10/151* (2018.01)

(58) Field of Classification Search
CPC ............. G06F 13/1673; G06F 13/4022; G06F 13/4027; G06F 13/4282; Y02D 10/14; Y02D 10/151; H04L 47/122; H04L 45/02; H04L 45/22
See application file for complete search history.

(56) References Cited

U.S. PATENT DOCUMENTS

| | | | |
|---|---|---|---|
| 8,793,358 B1 | 7/2014 | Godbole et al. | |
| 2002/0051427 A1* | 5/2002 | Carvey | H04L 49/251 370/254 |
| 2008/0276032 A1* | 11/2008 | Iida | G06F 3/0619 710/316 |
| 2011/0064084 A1 | 3/2011 | Tatar et al. | |
| 2014/0143470 A1* | 5/2014 | Dobbs | G06F 15/76 710/308 |

(Continued)

OTHER PUBLICATIONS

Alaghi et al., "Reliable NoC Architecture Utilizing a Robust Rerouting Algorithm," Design and Test Symposium (EWDTS), 2008 East-West, 4 pages, Oct. 2008.

(Continued)

*Primary Examiner* — Ayaz R Sheikh
*Assistant Examiner* — Debebe A Asefa
(74) *Attorney, Agent, or Firm* — Rathe Lindenbaum LLP

(57) ABSTRACT

An apparatus and method detects trapped data at an intermediate node in a network path between a source node and a destination node, and re-routes that data to a downstream intermediate node in the network path via an alternate network path. An apparatus and method may include a virtualized physical interface, and may redirect the trapped data through a system's packet switched network, or through a system's flit switched network.

20 Claims, 12 Drawing Sheets

(56) References Cited

U.S. PATENT DOCUMENTS

2015/0039747 A1  2/2015 Meloche
2015/0180790 A1* 6/2015 Rimmer .................. H04L 47/39
                                                    370/368

OTHER PUBLICATIONS

Yoginanth et al., "Runtime Performance and Virtual Network Control Alternatives in VM-Based High-Fidelity Network Simulations," Proceedings of the 2012 Winter Simulation Conference, pp. 2800-2812, 2012.

* cited by examiner

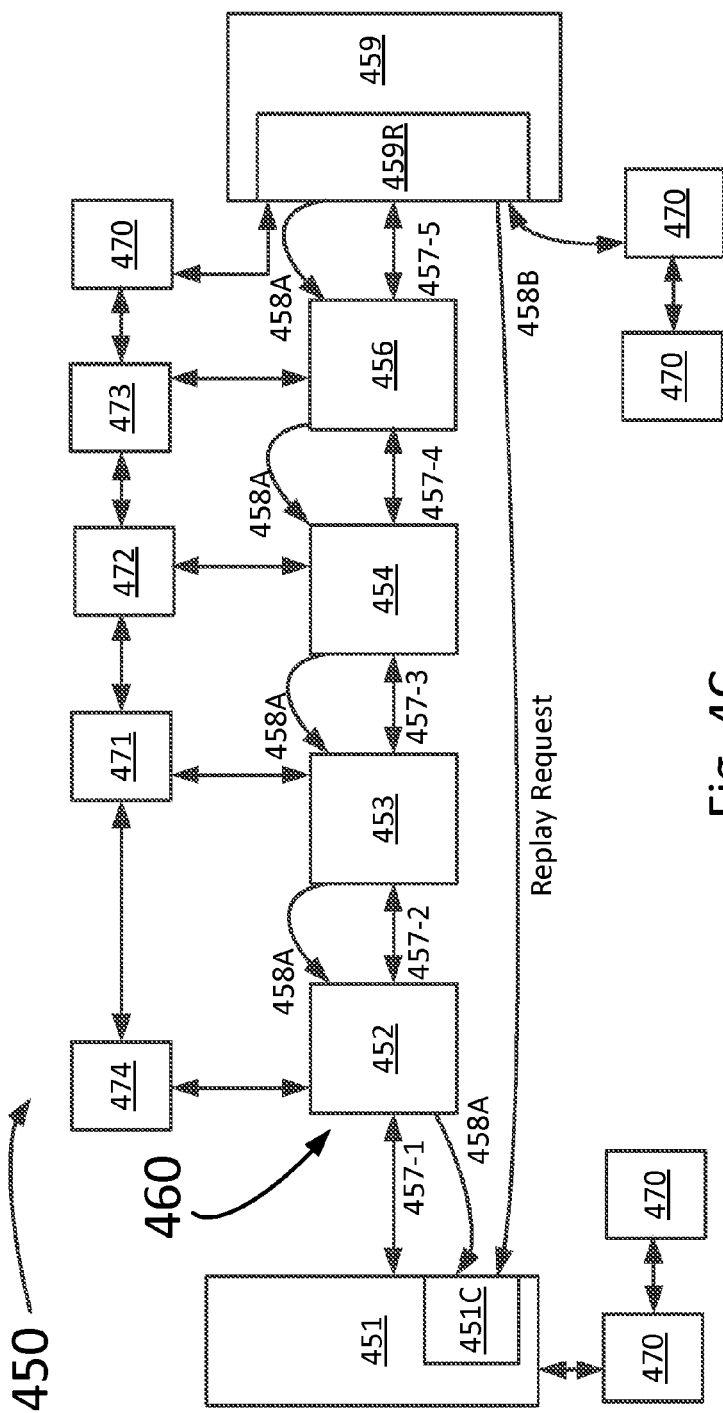
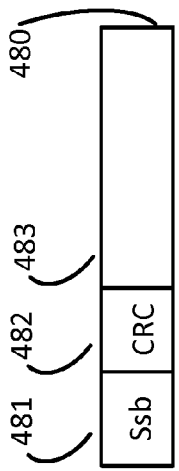
Fig. 4C
Fig. 4B

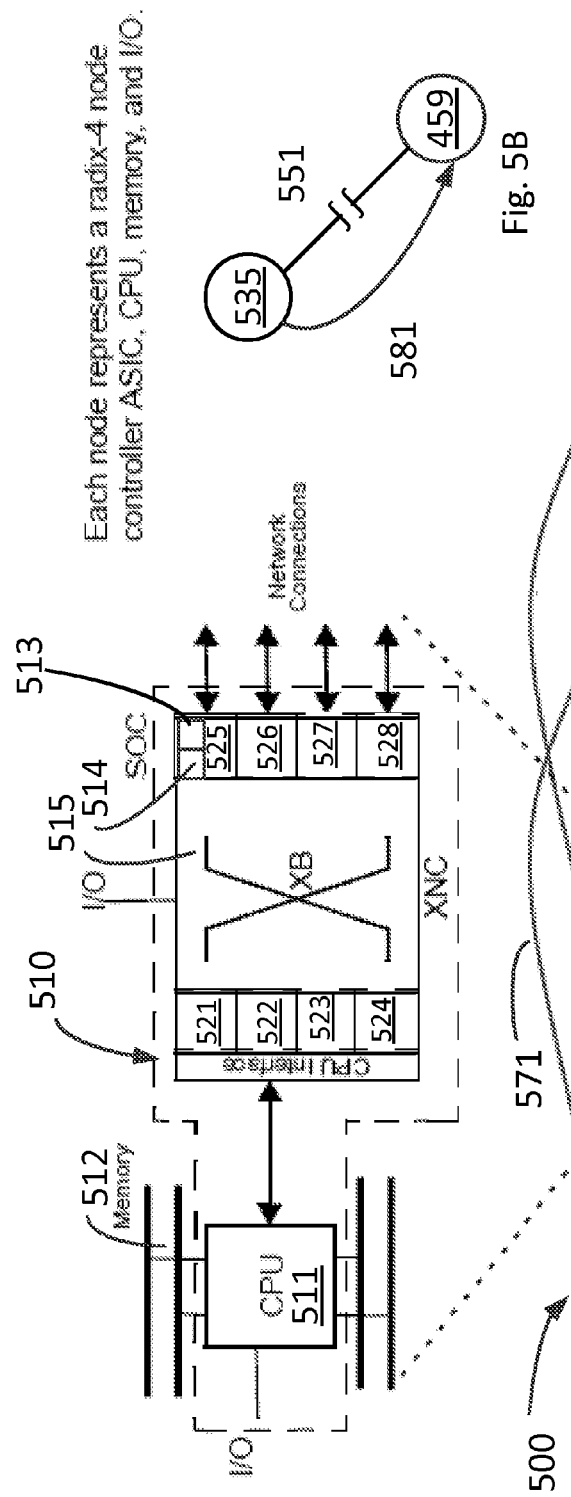
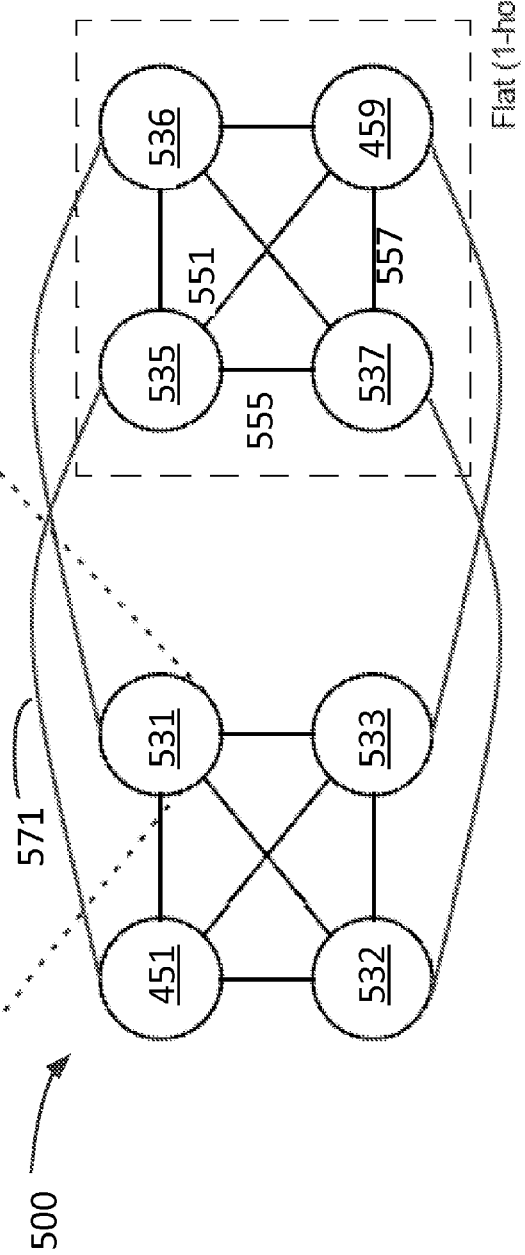
Fig. 5A
Fig. 5B

ADAPTIVE ROUTING FOR LINK-LEVEL RETRY PROTOCOL

FIELD OF THE INVENTION

The invention generally relates to high performance computing systems and, more particularly, the invention relates to data communication in a high performance computing system.

BACKGROUND OF THE INVENTION

In distributed processing systems, multiple processors communicate with each other and with memory devices to perform a shared computation. Because the types of computations involved are generally very complex or require a great deal of processing power, this type of communication often must be very high speed, and is typically implemented over a path through interconnected nodes within a fabric.

In some circumstances, such as a when a node between an intermediate node and an adjacent node in a data path becomes impassable, a data flit sent along that path by a source to a destination may become trapped at the intermediate node. Prior art methods of addressing data transmission errors, such as link-level retry among the nodes of the network, or a replay request from the destination to the source, are unable to salvage the trapped data, for example where the intermediate node is the only node that has a copy of the flit.

SUMMARY OF VARIOUS EMBODIMENTS

Various embodiments provide automatic re-route of data around a failed link in a computer network system that utilizes link level retry. The link failure can be slow or sudden and the reroute takes place automatically and contemporaneously with the time of failure without requiring reboot or re-initialization of the computer.

Illustrative embodiments may be described as a method, or computer circuitry for implementing the method. To that end, embodiments include a method of transmitting computer system data between nodes of a high performance computer system, wherein the data is initially transmitted from a source node of the high performance computer system to a destination node of the high performance computer system on a primary data path over a plurality of links between intermediate nodes in the fabric of the high performance computer system.

The method includes detecting an impassable link coupled to a given node of the high performance computer system in the primary data path. For example, the step of detecting an impassable link may include detecting a physical or electrical break in a link coupled to the node, on which link the trapped data was to have been transmitted.

The method also includes identifying trapped data at the given node; and for each flit in the trapped data, salvaging the flit at the given node by re-encoding the trapped flit into a salvaged flit, so that the trapped data is transformed into salvaged data.

Then, the method sends the salvaged data from the given node to the destination node of the same high performance computer system via an alternate path that circumvents the impassable link. For example the step of sending the salvaged data may include re-routing the trapped data to a subsequent node over a logic network dedicated to that purpose, or by sending the salvaged data via a virtual network, to name just two examples.

To those ends, the node may include a physical layer, and a virtualized physical interface in the physical layer, as described below.

Some systems include both a packet switched network and a flit switched network. In such embodiments, the virtualized physical interface includes a flit re-encoder configured to redirect each flit through the flit switched network.

Various embodiments may be implemented in circuitry within a High Performance Computer. For example, in one embodiment, an intermediate node forms part of a primary data path through a fabric between a source node and a destination node. The intermediate node includes a sending circuit configured to prepare flits for transmission over the fabric, and a physical layer circuit operably coupled to the fabric. The physical layer is configured to receive flits from the sending circuit and transmit the flits over the fabric to a downstream node on the primary path.

In addition to the physical layer circuit, the intermediate node also includes a virtualized physical interface (or "failover circuit") operably coupled between the sending circuit and the transmitter circuit. The virtualized physical interface is configured to receive or intercept the flits from the sending circuit in response to a failover signal, and redirect the flits away from the physical layer to an alternate node in the fabric.

In some embodiments, the failover circuit includes a flit re-encoder to receive a trapped flit from the sending circuit, and re-encode the trapped flit into a salvaged flit. The node may also include a receiver circuit operably coupled to the flit re-encoder. The flit re-encoded sends the salvaged flits to the receiver circuit. To that end, the receiver circuit may include a queue operably coupled to the flit re-encoder to receive the salvaged flit from the flit encoder.

In other embodiments, the flit re-encoder is operably coupled to a flit switched network to send the salvaged flit over the flit switched network.

In another embodiment, a system for transmitting a flit to a destination node through a fabric in a high performance computer includes a sending node configured to delete the flit after transmitting the flit across a link to a downstream node in a primary path through the fabric. As a consequence, the flit becomes trapped data if a subsequent link from the downstream node becomes impassable.

The downstream node includes a failover circuit configured to salvage the trapped data at the downstream node, such that the trapped data is salvaged data. The system also includes a secondary path through the fabric, and the failover circuit is configured to send the salvaged data to the destination node via the secondary path.

In some embodiments, the failover circuit includes a flit re-encoder circuit to receive a trapped flit, and re-encode the trapped flit into a salvaged flit.

The flit re-encoder may be operably coupled to a receiver circuit in the downstream node to send the salvaged flit to the secondary path via the receiver circuit. To that end, the receiver circuit may include a queue operably coupled to the flit re-encoder to receive the salvaged flit from the flit encoder.

Alternately, the flit re-encoder may be operably coupled to a flit switched network to send the salvaged flit over the flit switched network.

In various embodiments, the sending node includes at least two network interface circuits: a first network interface operably coupled to the primary path through fabric and a second network interface operably coupled to the secondary path through the fabric.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4B schematically illustrates an embodiment of a flit;

FIG. 4C schematically illustrates an embodiment of a fabric across which flits and packets may be transmitted;

FIGS. 5A-5C schematically illustrate an embodiment of a flat memory with networked nodes;

DESCRIPTION OF ILLUSTRATIVE EMBODIMENTS

Illustrative embodiments improve the operation of data communication within a high performance computing system by re-routing data that is trapped in a node, which node may be referred to as a trap node. Because trapped data is unable to complete the journey along its designated primary path, various embodiments re-route the trapped data along an alternate path to ultimately arrive at its destination. In some embodiments, subsequent data is routed to avoid the trap node. In various embodiments, such re-routing may occur over an existing packet switched network within the high performance computing system, and in other embodiments, the re-routing may occur over a flit-switched network provided for that purpose.

Re-routing the trapped data is distinguishable from prior art methods that requesting that a copy of the data be re-sent from another location, such as a node requesting that a flit be re-sent from an upstream node, or a destination node requesting that a packet be re-sent from a source node, because those methods are unable to salvage the trapped data from the trap node. In any event, such prior art methods are unlikely to succeed when a link in the data's primary path is impassable, since such prior art methods merely attempt to resend the data over the same path.

Definitions. As used in this description and the accompanying claims, the following terms shall have the meanings indicated, unless the context otherwise requires:

In some embodiments, a "flit" (or "flow-control-unit") is a micro-packet of information sent across a fabric. In the OSI model context, a packet may be formed at level 2.

In some embodiments, a "packet" is a set of one or more flits. In the OSI model context, a packet may be formed at level 3.

In some embodiments, the term "sideband" (or "sideband" or "Ssb") means a data field within a flit that contains metadata about the flit, such as the flits ultimate destination for example.

In some embodiments, the term "control data" refers to metadata about a flit and/or its payload. For example, control data may identify the type of flit, and/or the number of flits in a packet, and/or the originator of a packet and/or the destination of a packet, to name but a few examples.

In some embodiments, the term "CRC-sb" (or "crc-sb," or "crcsb") means a cyclic redundancy check value for sideband data in a sideband data field.

In some embodiments, the term "CRC-pl" (or CRCpl) means a cyclic redundancy check value for payload data.

Various embodiments may be implemented within the Open Systems Interconnection model (or "OSI model"), although that is not a requirement of any embodiment. For example, various embodiments may receive data from level 3 of the OSI model, and format, transmit, and receive data using level 2 and level 1 of the OSI model. However, references to any layer within the OSI model is for illustrative purposes only.

System Architecture

Figure 1:
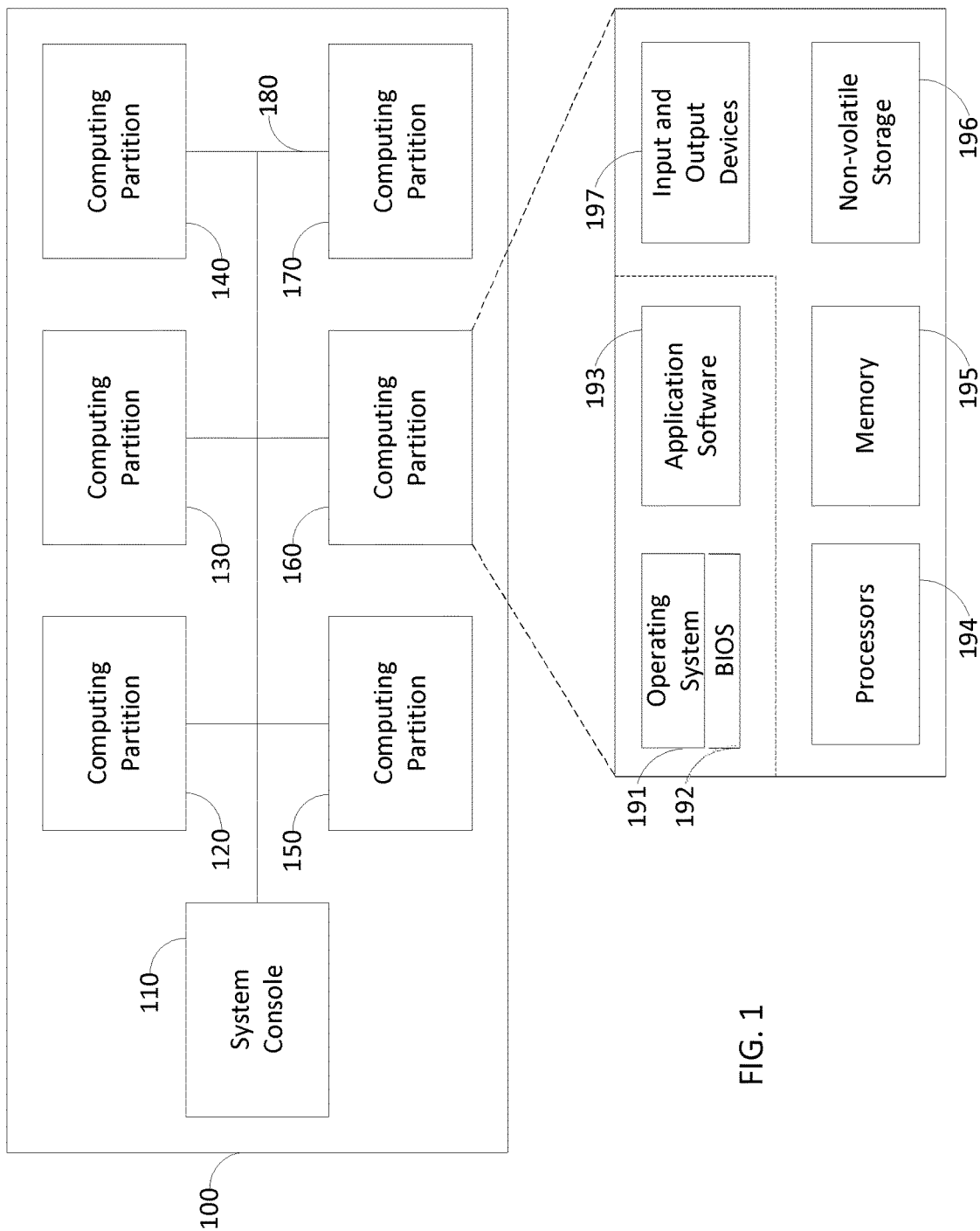
FIG. 1 schematically illustrates a logical view of an embodiment of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
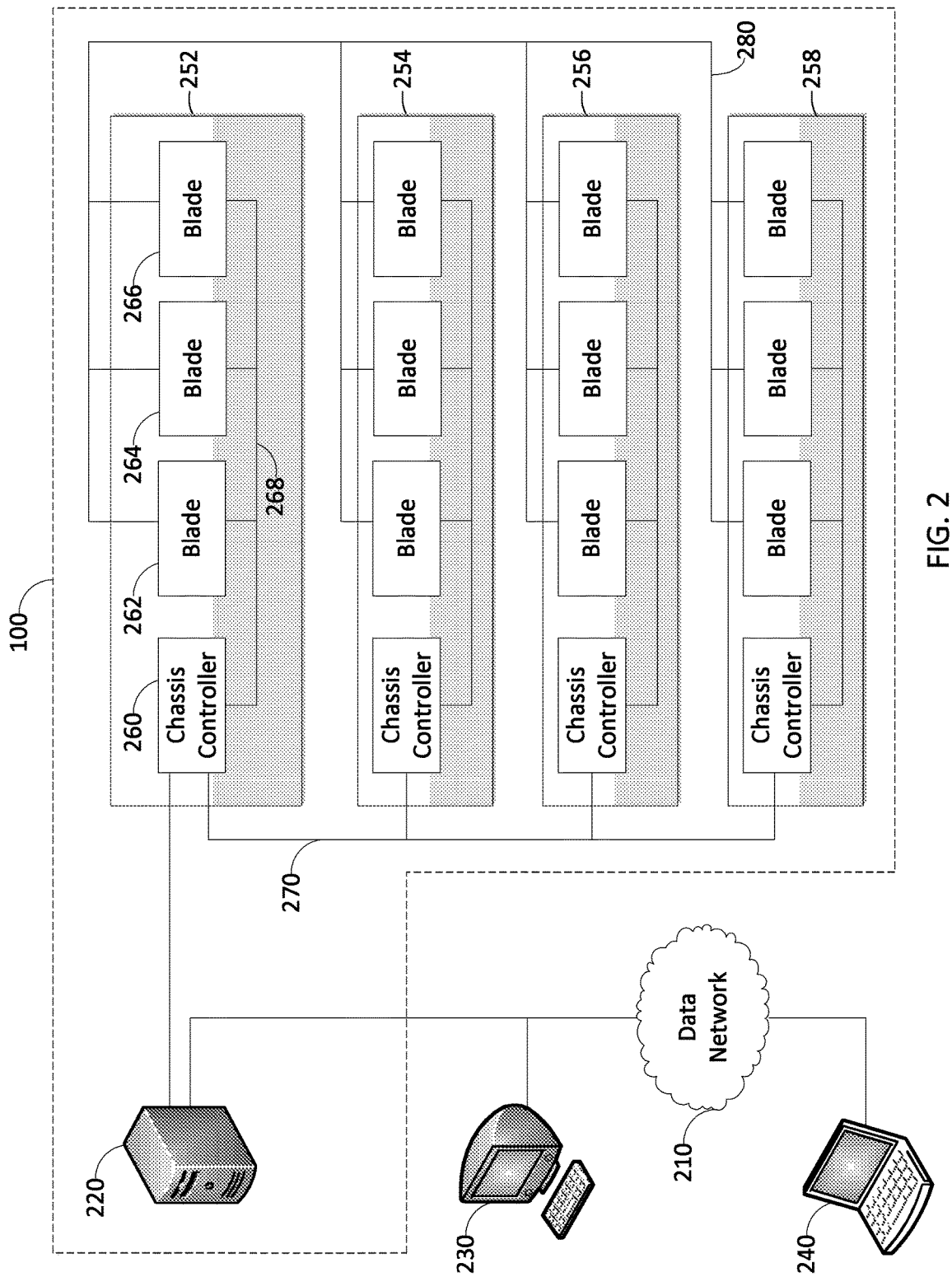
FIG. 2 schematically illustrates a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Milpitas, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
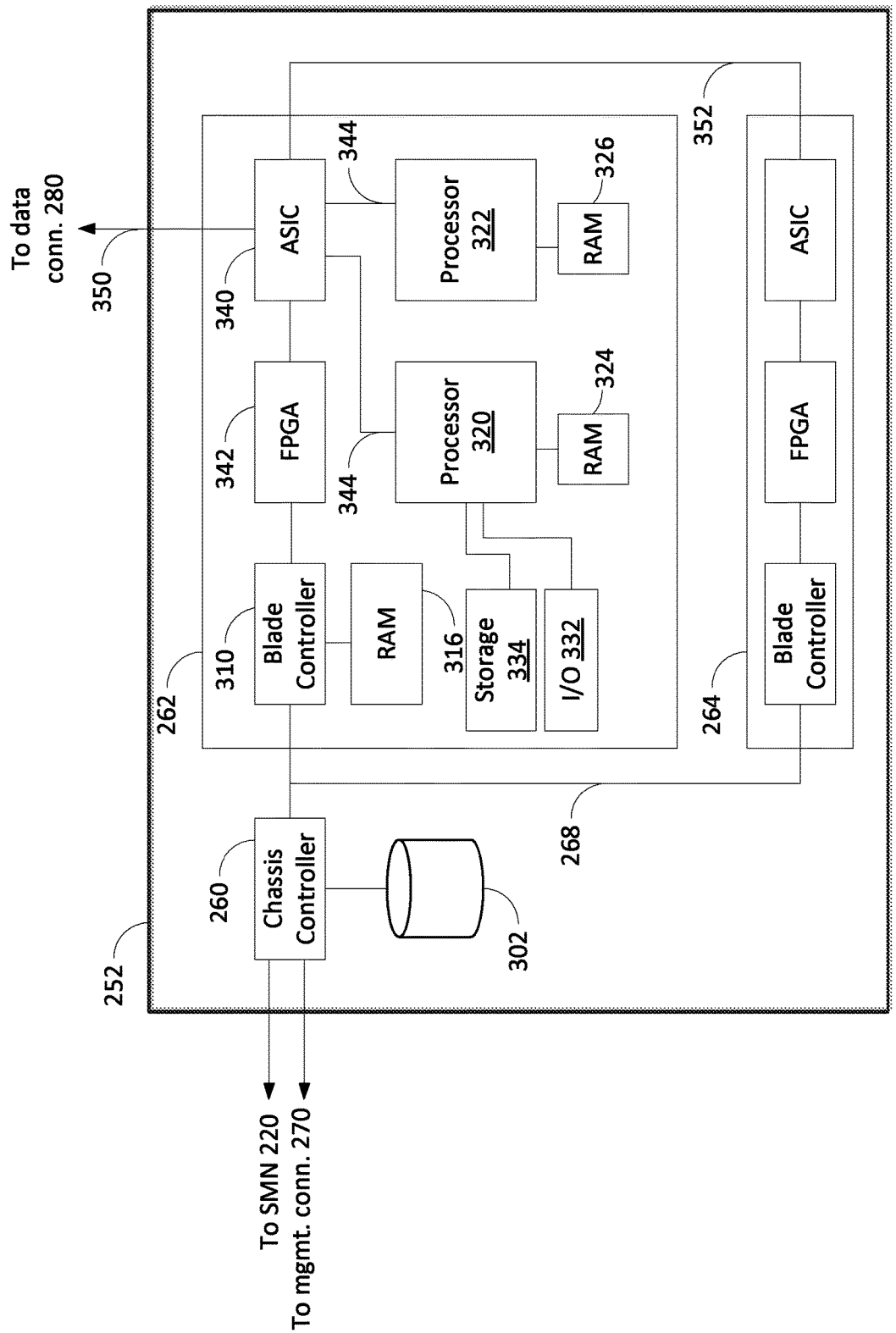
FIG. 3 schematically illustrates details of an embodiment of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 ("SMN") and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "HPC System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more microprocessors 320, 322 (alternatively referred to as "processors 320 or 322" or generically referred to as "processors 320") that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various embodiments of the invention.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

Data Communication

Figure 4A:
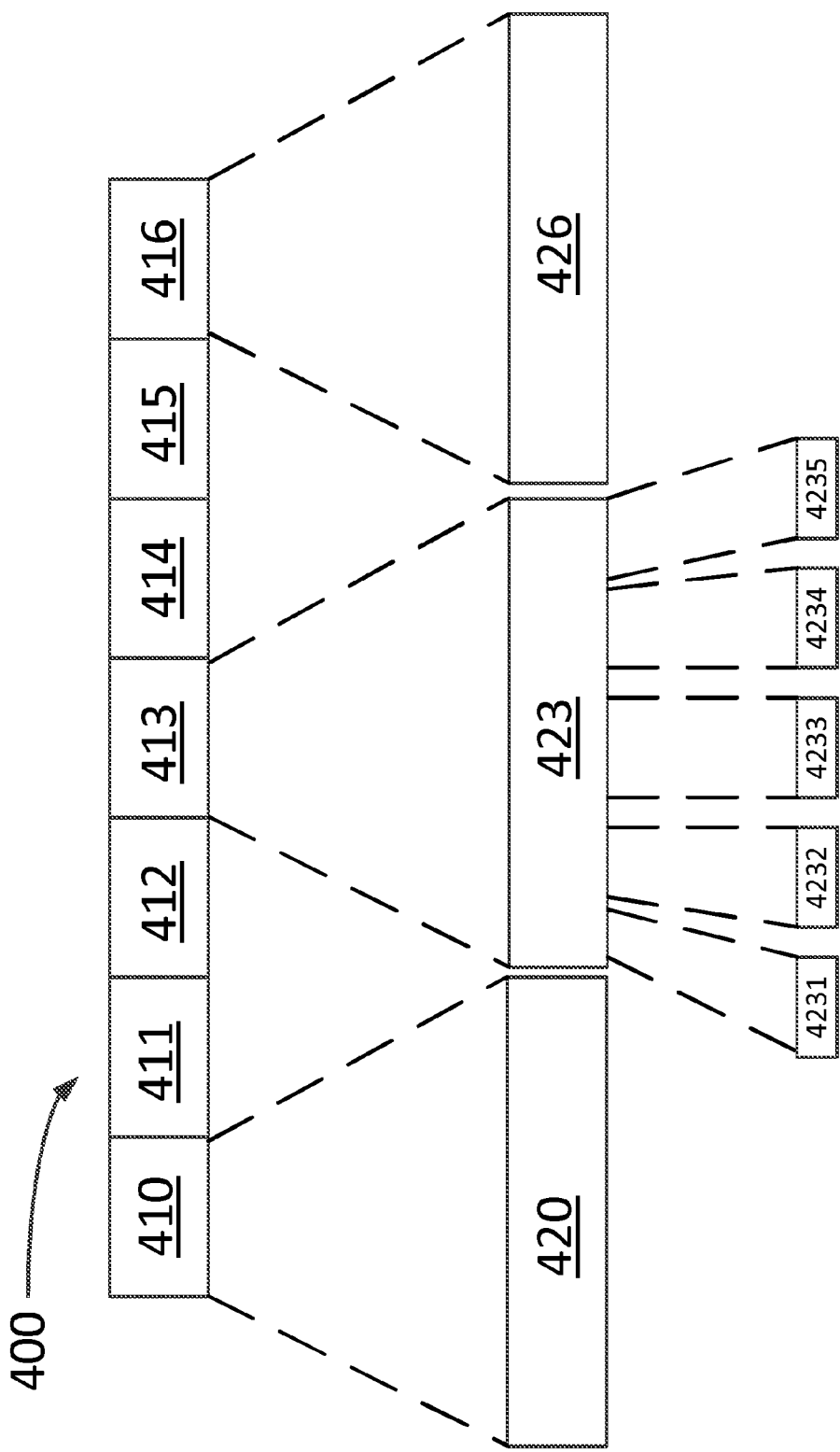
FIG. 4A schematically illustrates an embodiment of a data block to be transmitted, and several data packets and flits.

FIG. 4A schematically illustrates a block of data (or "data block") 400 to be transmitted from a source node to a destination node. Various embodiments may segment the data block 400 into smaller sub-blocks (410-416, in this example), and each sub-block may be further segmented into micro-blocks 4231-4235. Each sub-block is then transmitted from the source node to the destination node in a packet (e.g., 423) composed of a number of flits, as described further below. Each of the sub-blocks (410-416) within the data block 400 is similarly segmented into micro-blocks, but some of those micro-blocks are omitted from FIG. 4A to avoid cluttering the drawing.

FIG. 4B schematically illustrates a flit 480 having a sideband (Ssb) field 481 and CRC field 482 that carry Ssb data and CRC values (which may be either CRCsb data, CRCpl data, or both), respectively. The length of flit 480 may be determined by the system designer, so the following are merely examples, and do not limit the disclosure or claims. In this embodiment, the flit 480 flit has a total length of 152 bits: the Ssb field 481 occupies 8 bits, the CRC field 482 occupies 16 bits, and the payload field 483 occupies 128 bits of data such as microblock 4231.

Various embodiments may be implemented within the Open Systems Interconnection model (or "OSI model"), although that is not a requirement of any embodiment. For example, various embodiments may receive data from level 3 of the OSI model, and format, transmit, and receive data using level 2 and level 1 of the OSI model. However, references to any layer within the OSI model is for illustrative purposes only.

A fabric 450 is schematically illustrated in FIG. 4C, and includes a source node 451, which in this example is the ultimate source of the data packet to be transmitted, and a destination node 459 which in this example is the ultimate destination (the final stop) of a packet sent by the originator 451. The source node 451 includes a transmitter circuit, circuitry for preparing a packet, and a control interface (e.g., 451C), and the destination node 459 includes circuitry 459R for receiving decoding received data, as known for example from the art of OSI-based networks.

Generally, data (e.g., flits, in this example) travels across the fabric 450 from source node 451 to destination node 459 by hopping "downstream" from one node to the next in a virtual channel 460. In the example of FIG. 4C, intermediate nodes 452, 453, 545 and 456 form the virtual channel 460 between source node 451 and destination node 459.

For example a flit may travel individually from the source node 451 to the destination node 459 by making a series of hops, including a first hop from the source 451 to intermediate node 452, across link 457-1, and making subsequent hops using other links (457-2; 457-3; 457-4; 457-5) to other intermediate nodes (453; 454; and 456), and eventually to the destination node 459. Consequently, the fabric 450 may be referred to as a "packet switched" network.

To that end, each of the intermediate nodes 452-456 includes at least one receiver circuit and at least one transmitter circuit, and acts as both a receiver of data sent by an upstream node (e.g., node 452 receives data from node 451 over link 457-1) and a transmitter of that data to a downstream node (e.g., node 452 sends the data downstream to node 453 over link 457-2).

The source 451 and destination 459 are part of the fabric 450, and are end points in the virtual channel 460, but also may be intermediate points in other virtual channels. Similarly, in some embodiments, any of the intermediate points 452-456 could be a part of a different virtual channel within fabric 450, or could even be a source or end-point of such a different virtual channel, while still serving as an intermediate point in the virtual channel 460. Moreover, as shown in FIG. 4C, the fabric 450 includes a number of other points 470; 471; 472, other than the points that compose the virtual channel 460. A different virtual channel could be configured from a subset such other points 470; 471; 472, and could optionally include some or all of the points 452, 459, and/or 452-456.

In some embodiments, a communications a link (e.g., 457-1, etc.) may be a physical medium, such as a data cable, or a trace on a printed circuit board, or conductors within a semiconductor, or optical fibers, to name but a few examples. In some embodiments, one or more of the links (e.g., 457-1, etc.) could even be a wireless connection.

In operation, the destination node 459, and each intermediate point (452-456), may evaluate each flit and/or each packet that it receives, and send a signal 458A upstream to the sending node. For example, if intermediate point 453 receives a corrupted flit from intermediate point 452 across link 457-2, the intermediate point 453 may request that the flit be resent by intermediate point 452 by sending a "resend" request cross link 457-2 as signal 458A. Such a resend request may be known as link level automatic repeat request (ARQ). The intermediate point 453 also sends an acknowledgement as signal 458A to acknowledge that the flit was received and its integrity verified.

To implement resend functionality, each sending node retains a copy of the flit after sending the flit on its next hop. However, retaining flits uses valuable queue space in the sending node. Even more resources are consumed if a node (e.g., a source node 451) retains an entire packet until the entire packet is received at its destination. Therefore, sending nodes in some embodiments delete flits after receiving an acknowledgment signal.

However, the inventors have recognized a potential problem with prior art methods and networks when, as described above, a sending node deletes its copy of transmitted data when a receiving node acknowledges receipt of that data. In that case, the receiving node is the only node in the network that has a copy of the data, and if that receiving node is unable to send that data on to its next hop, then the data is trapped at the receiving node.

In prior art HPC networks, such trapped data was not recoverable. Even if a node were able to request retransmission of a flit from its source, that source would not be able to comply with that request because the source has already deleted the flit. Moreover, even if initiated, such a re-transmission would fail again if a link in the path remains impassable or otherwise non-functional.

Such a situation is described in connection with FIGS. 5A-5C, below, which schematically illustrate an embodiment of a packet switched network, or fabric, 500. In this example, the network 500 is configured as a flat memory with networked nodes, although the principles described below are not limited to flat memory networks.

One or more of the nodes in network 500 may be referred to as a "super node" or "fat node" 510.

A super node 510 may be a circuit, such as an application specific integrated circuit ("ASIC") for example, that includes a processor 511 which may be a microprocessor such as an Intel Core family of microprocessors, or a microprocessor core available from ARM, to name but two examples, and a digital memory 512 configured to store instructions for execution by the processor 511 and/or data. A super node 510 may also include one or more CPU interfaces 521, 522, 523 and 524 in communication with the processor 511, and a plurality of network interfaces ("NI") 525, 526, 527 and 528 each coupled to a network fabric, as well as a switch (or "cross switch") 515 connected to controllably couple any of the network interfaces 525, 526, 527 and 528 to any of the CPU interfaces 521, 522, 523 and 524.

Figure 5C:
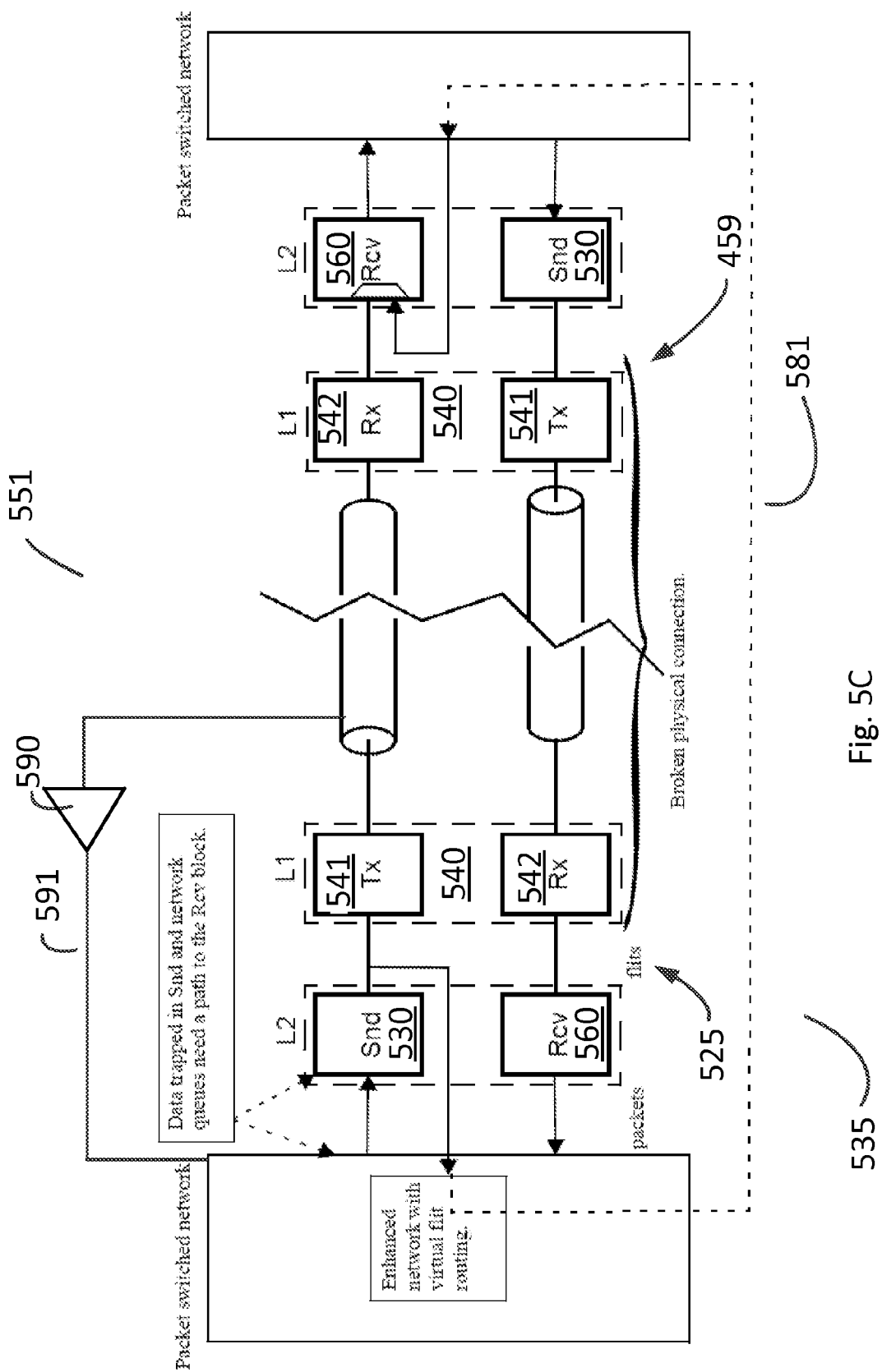

FIG. 5C schematically illustrates a network interface 525 at node 535. The network interface includes a send circuit 530 coupled to a transmitter 541 in a physical layer 540. Various embodiments of the send circuit 530, including sending circuit 730 and sending circuit 830 described below, prepare a flit for transmission over the link 551 by the transmitter 541. For example, the send circuit may perform sending functions of layer 2 in the OSI model.

Consequently, the processor 511 of super node 510 may communicate with one or more other nodes via the network 500. For purposes of illustration, node 535 is described below.

In operation, a node 535 receives one or more flits at a network interface (e.g., 525) and assesses the flit to determine whether the node 535 is the flit's ultimate destination, or whether the flit must be transmitted to a subsequent node in the network 500. Note that if node 535 has acknowledged its receipt of the flit from upstream node 451, and node 451 has deleted its copy of the flit, then node 535 has the only copy of the flit (since node 451 will already have deleted its copy).

If the node 535 determines that the flit must be transmitted, the node 535 determines which is the next node in the flit's path, and transmits the flit, through the same or another network interface, across a link to the next node. For example, in FIG. 5B, the next node may be node 459, which also may be the flit's ultimate destination.

To that end, the network interface may consult a routing table 513 to determine which node is the next node in the flit's path, based on the flit's destination, and then transmit the flit from a network interface coupled to a link between the node and the next node. As such, a flit 480 may travel from source node 451 to destination node 459 in two hops—a first hop from node 451 to node 535, and a second hop from node 535 destination node 459. The virtual channel defined by nodes 451, 535, and 459 may be referred to as the flit's "primary path."

A problem arises if the transmitting node is unable to send the flit to the subsequent node in the flit's path. For example, a flit at node 535 may be destined for node 459 (which may be its ultimate destination), but the link 551 between node 535 and node 459 may become unable to pass the flit if the link 551 is broken or otherwise impassable. This may be, for example, because the link 551 has been physically or electrically severed as schematically illustrated in FIG. 5C, or because the link 551 is otherwise incapable of carrying data. Consequently, the only existing copy of the flit is trapped at node 535. In some embodiments, such a failed physical connection in an end-to-end network can cause data to become trapped in send and network queues. Further, if link level automatic repeat request (ARQ) is used, the data is unrecoverable because the source does not store copies (it relies on link level ARQ protocol for reliable transport).

A flit arriving at the network interface in node 510 is received by receiver circuit 542 in the physical layer 540, which sends the flit to reception circuit 560. The reception circuit 560 processes the flit, for example by performing reception functions of layer 2 in the OSI model. Various embodiments of the reception circuit 560, including reception circuit 760 and reception circuit 860 described below, prepare a flit for transmission over the link 551 by the transmitter 541.

Figure 6B:
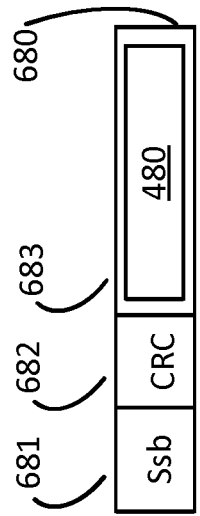
FIG. 6B schematically illustrates an embodiment of a re-encoded packet.
Figure 6A:
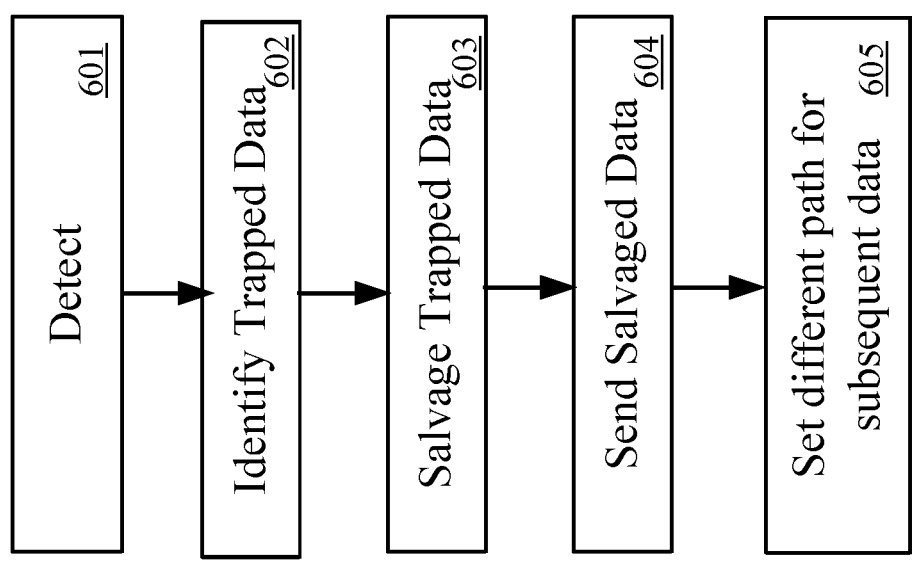
FIG. 6A is a flow chart illustrating a method of adaptive routing to rescue trapped data.

An embodiment of a method 600 for recovering trapped data is presented in FIG. 6A, and described in connection with the network in FIG. 5B. An impassable connection is automatically detected and replaced with a virtual path for recovering trapped data. Packets that follow the trapped flits are rerouted around the broken link using standard adaptive practices. This technique solves a resilience issue prior art systems by providing a complete recovery mechanism for failed connections.

At step 601, the method 600 detects a network condition in which data may be trapped. For example, a link monitor circuit 590 may determine that the link 551 in the primary path 571 (in the example of FIG. 5B, the primary path is from node 451 to node 535 to node 459) is impassable and notify the processor 511 with a "failover" signal 591. In some embodiments, the link monitor circuit 590 may be a comparator or A/D converter configured to monitor signal levels on the link 551, to name but a few examples. In other embodiments, a node may detect an impassable link, and generate a failover signal 591, when data in a send queue times out (for example, data has been in the send queue for a time longer than desired, or longer than necessary to be successfully transmitted and an acknowledgement received).

When such a "failover" condition has been detected at step 601, step 602 identifies trapped data by, for example, identifying data destined to leave over the impassable link 551. Such data may be the flits in data queue 731, for example.

Trapped data is salvaged by, for example, re-routing the data at step 603. Re-routing the data involves sending the data through the network via an alternate path 581 (e.g., a secondary path or detour), since the data cannot traverse the impassable link 551. Node 535 may re-route the trapped data by, for example, consulting the routing table 513 (or a secondary routing table) and transmitting the data accordingly. For example, in FIG. 5B, data trapped at node 535 may be re-routed to node 537 via link 555. Illustrative embodiments re-encode each trapped flit into a corresponding salvaged flit 680 for the transmission described above.

It should be noted that salvaging the trapped data involves moving the data from the network interface or node where it is trapped, rather than requesting or sending a fresh copy of the data from an upstream node or the source of the data.

Subsequently, node 537 transmits the data at step 604. For example, the salvaged data may be transmitted to node 459 via link 557. It should be noted that some embodiments transmit the salvaged data to the next node on the data's primary path, i.e., the node at the other end of the impassable link, rather than simply sending the data to its ultimate destination by another path. In this way, the data proceeds along its primary path, and traverses all nodes on that primary path along with the added detour 581 around the impassible link. FIG. 5C schematically illustrates one direction of a symmetrical detour 581, from node 535 since to node 459. Taking an example from FIG. 4C, data trapped at node 453, when link 457-3 is impassible, may be re-routed to its next downstream node 454 in path 460 by a detour through nodes 471 and 472.

In step 605 of some embodiments, subsequent data from node 451 destined for node 459 via node 535 may instead be routed via a third route (in this example, node 451 to node 533 to node 459), in response to a failover signal 591, to avoid node 535 since it cannot reach node 459 from node 535. Taking an example from FIG. 4C, when link 457-3 is impassible, node 451 may send future data to node 459 by a third route including nodes 452, 474, 471, 472, 473, and 456.

Figure 7A:
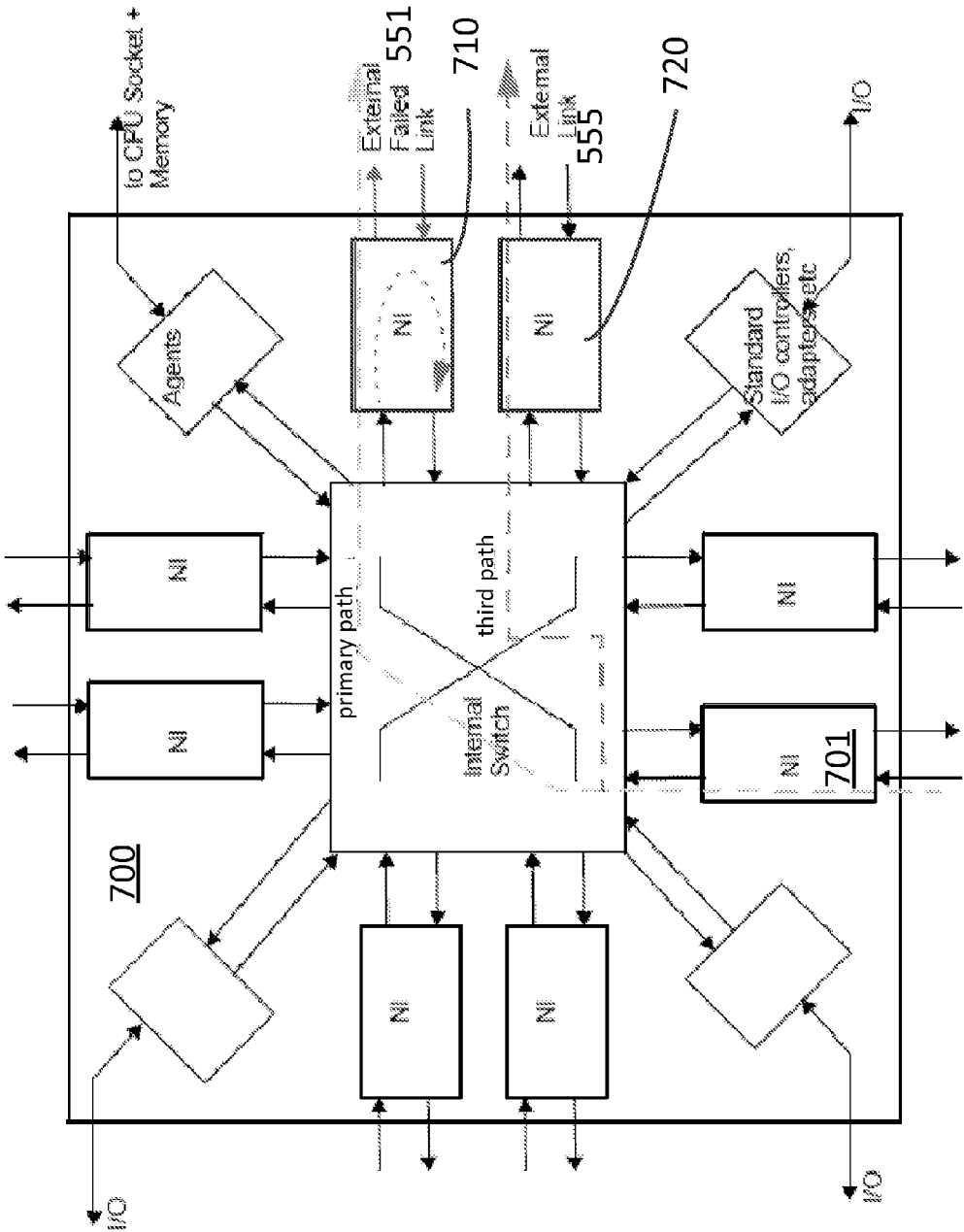
FIGS. 7A-7B schematically illustrate an embodiment of a virtual channel.
Figure 7B:
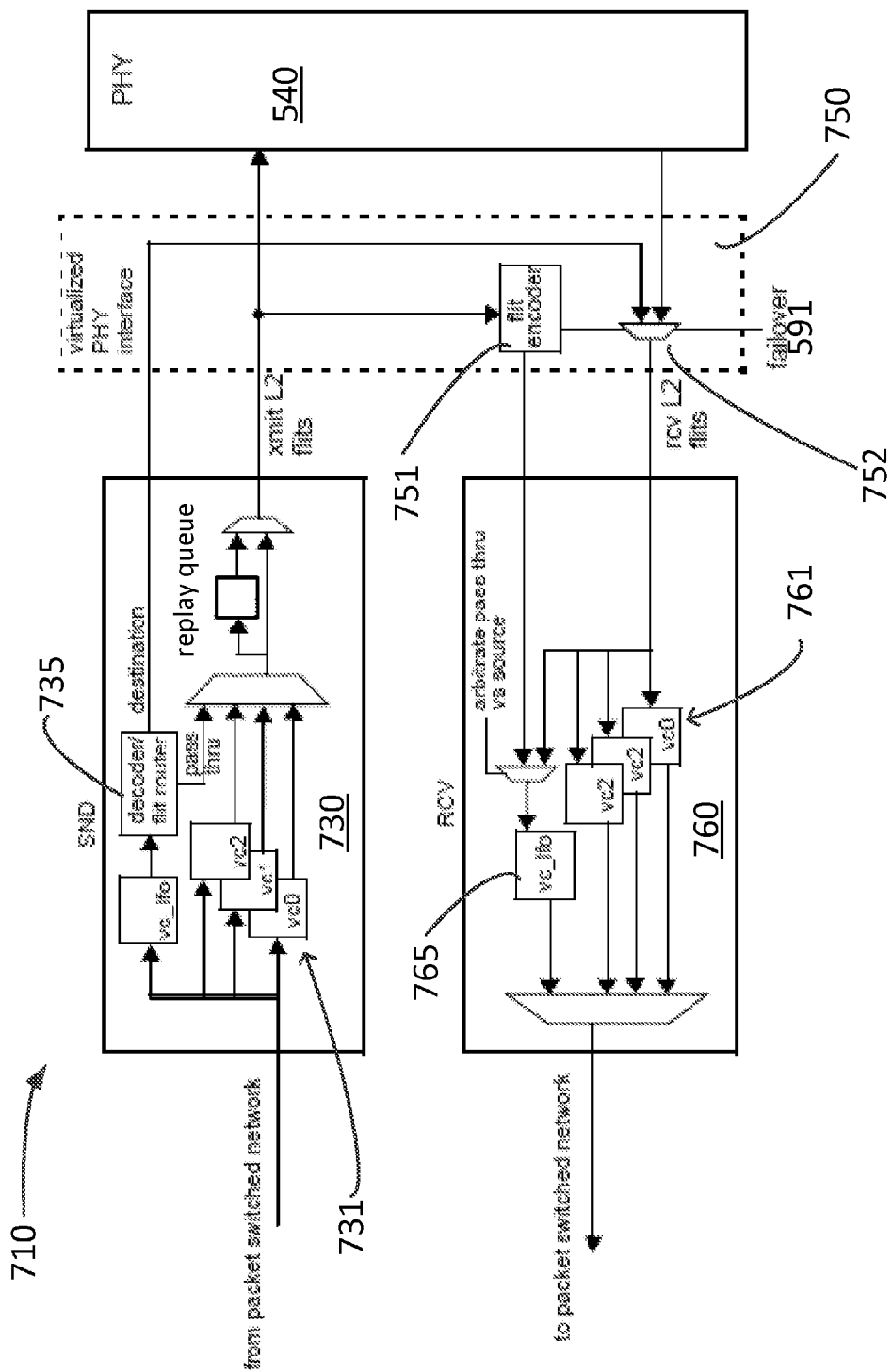

Virtual Network—FIGS. 7A and 7B

An embodiment of a node circuit 700 to implement at least some of the steps of the method 600 is schematically illustrated in FIGS. 7A and 7B. For purpose of illustration, the node circuit 700 is described in terms of a super node 535 in the fabric of FIG. 5A. Data arriving at node 535 bound for node 459 over link 551 may be referred to as "outbound" data, and data arriving a node 535 via an alternate route from node 459 may be referred to as inbound data.

Normal Operation

In normal operation, when link 551 is capable of transmitting data from node 700 to node 459, flits arrive at network interface 701 and are guided to network interface 710 by the switch 515. The outbound flits are stored in a queue 731 (e.g., one of queues vc0; vc1; vc2), which queue is dedicated to holding flits destined for node 459 at the other end of the link 551. The flits in that queue 731 are subsequently transmitted across link 551 through physical interface 540.

Moreover, if link 551 is bidirectional (i.e., it can carry data in both directions), inbound data from node 459 arrives at the physical interface 540 of network interface 710 via link 551, and is transferred to the packet switched network by receiver 760.

Failover

On the other hand, when the link 551 is impassable—i.e., not capable of carrying data from a node at one end of the link to a node at the other end of the link—data in the sending circuit 730 (e.g., flits in queue 731) is trapped because the flits cannot leave the node 700 across the link 551. Moreover, no copies of the flits exist at the sender, or at any other node through which the flits have travelled, so the only way to successfully complete the transmission of the flits to node 459 is to recover it from the network interface 710.

Similarly, data at node 459 destined for node 535 over link 551 is trapped at node 459.

Failover Operation—Outbound Data

For trapped data destined for node 459, the network interface 710 redirects the trapped data to a virtualized physical interface 750, in response to a failover signal 591, to salvage the trapped data and send it to network interface 720 via the switch 515.

To that end, the network interface 710 includes a virtualized physical interface circuit 750 electrically and logically between sending circuit 730 and the network interface's physical interface 540. As schematically illustrated in FIG. 7B, the sending circuit 730 sends the trapped data to a flit re-encoder 751, which re-encodes the payload data so that the data is configured to travel through the fabric at least in part over an alternate route. In illustrative embodiments, the re-encoder 751 encodes each trapped flit 480 into the payload field 683 of another flit 680, which may be referred to as a "salvaged flit." The salvaged flit 680 may also include metadata in sideband field 681 to direct the salvaged flit 680 to its next node, and CRC data in field 682.

The flit re-encoder 751 sends the salvaged flits to receiving circuit 760, which transmits the salvaged flits over the packet switched network as if it were data received via the physical interface 540. For example, network interface 760 sends the data to another node (e.g., node 537) via link 555. In this way, data trapped in the network interface 710 is flushed out and sent on its way to the next node in its path. On arrival at the next node, the next node extracts the previously tapped flit from the salvaged flit. The next node determines whether it is the ultimate destination of the previously trapped flit, and if not, forwards that flit to the next hop on its primary path, whereupon the flit proceeds as if it had never been trapped by the impassible link.

Failover Operation—Inbound Data

Similarly, when the link 551 is impassable, data may be trapped at the node 459 at the far end of the link, unable to travel across the link 551 to the node 535. In such situations, the node 459 may salvage its trapped data and send it to the node 535 in the ways described above. Consequently, node 535 may receive inbound data from the node 459 via other links and nodes (e.g., link 557 to node 537, and link 555 to node 535). Such data may be initially stored in queue 735 of the sending circuit 730 for example, and transmitted from the network interface 710 through the packet switched network by being re-routed through the multiplexor 752 to the receiver circuit 760, which operates essentially as if the data had been received at physical interface 540 over link 551. The multiplexor 752 is controlled by failover signal 591 to send the data from queue 735 to the packet switched network via reception circuit 760 when the link 551 is impassable, and otherwise to send data received at the physical interface 540 over the link 551.

Figure 8A:
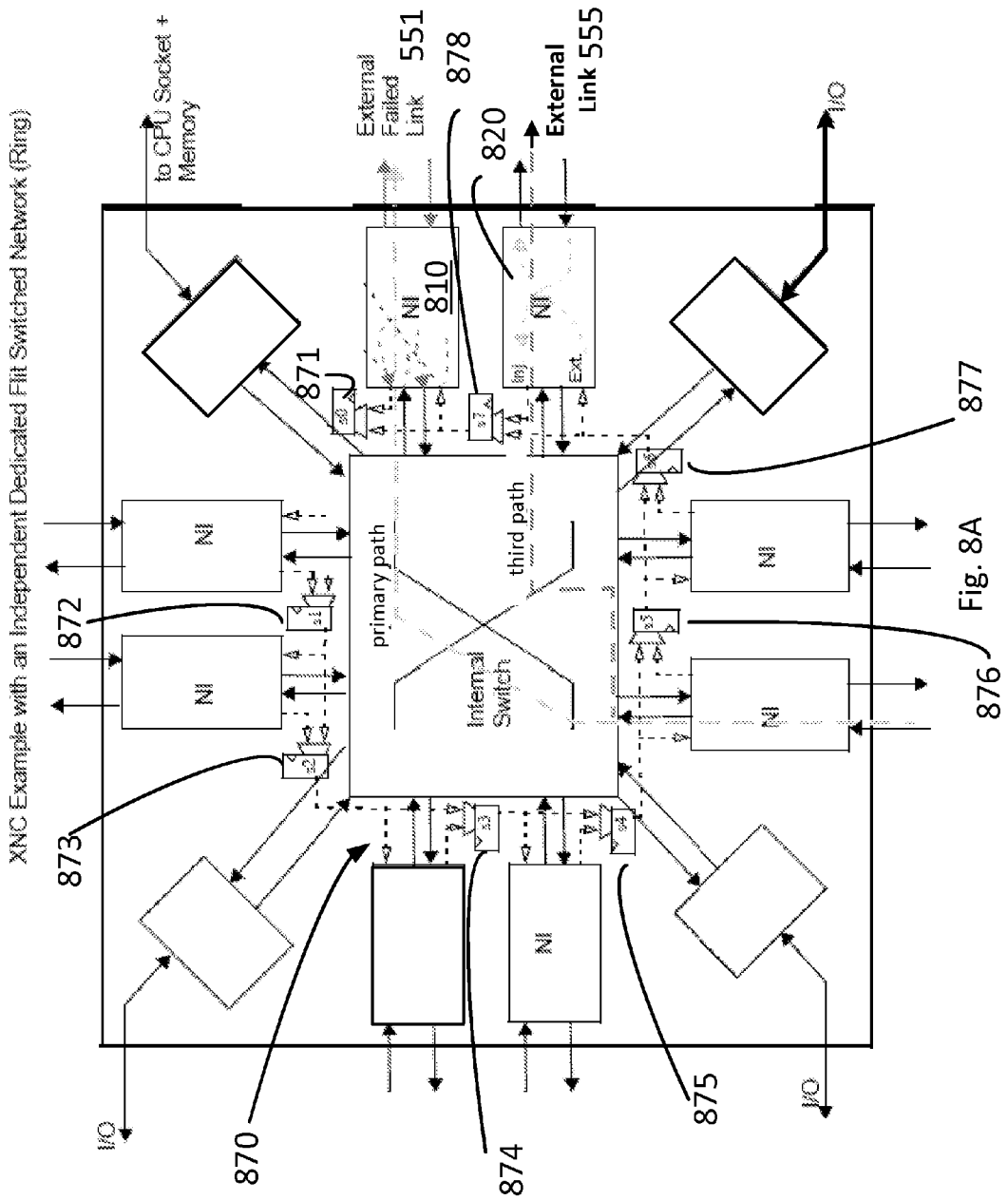
FIGS. 8A-8B schematically illustrate an embodiment of a hardware logic router.
Figure 8B:
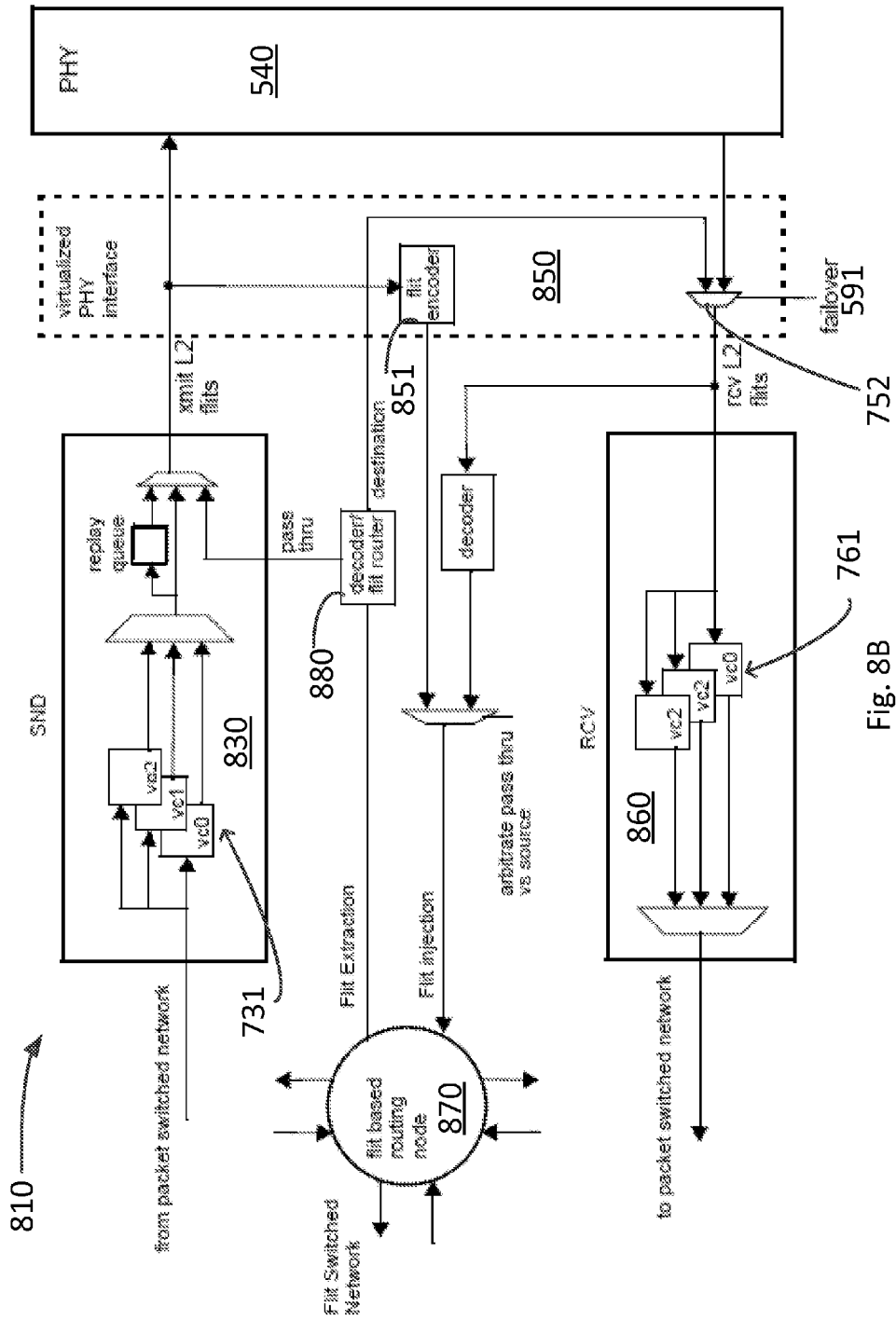

Flit Switched Network—FIGS. 8A and 8B

An alternate virtualized physical interface to implement at least some of the steps of the method 600 using a hardware logic router is schematically illustrated in FIGS. 8A and 8B.

Failover Operation—Outbound Data

In this embodiment, data trapped at network interface 810 is rerouted via a flit-switched network 870 dedicated to that purpose. The flit-switched network may be referred to as a dedicated logic network.

Data arriving at node 535 for transmission to node 459 is stored in one of queues 731 (e.g., queues vc0; vc1; vc2) while awaiting transmission across link 551. If link 551 is impassable, each flit of the data is sent to flit re-encoder 851 instead of out the physical interface 540. The flit re-encoder 851 re-encodes each flit into a salvaged flit 680 configured for transmission across the flit switched network 870, and sends it to ring router 871. The flit switched network 870 transmits the flit to another network interface 820 for transmission across link 555.

Failover Operation—Inbound Data

Data arriving from node 459 over the flit switched network 870 via ring router 878 is provided to decoder/flit router 880. If the node 535 is not the data's ultimate destination, then the decoder/flit router 880 goes into pass through mode in which the data is provided to a re-encoder 851, and then back to the flit switched network 870, at ring router 871 to be sent to another node.

On the other hand, if the node 535 is the data's ultimate destination, then the decoder/flit router 880 sends the data to the packet switched network via the reception circuit 860 via the multiplexor 752 essentially as if the data had arrived via the physical interface 540 over link 551.

Certain reference numbers used in connection with the foregoing description are listed below.

510: node circuit
511: CPU
512: Memory
513: Routing table
514: Alternate or secondary routing table
515: Switch
521-524: CPU interfaces
525-528: Network interfaces
530: Send circuit in network interface
531-533; 535-536: nodes
551; 555; 557: links
581: Alternate path around impassible link 560: Receive circuit in network interface
680: Salvaged flit
681: Sideband field of salvaged flit
682: CRC field of salvaged flit
683: Payload field of salvaged flit
700: Node circuit
701: Network interface
710: Network interface
730: Send circuit
731: Outbound data queue in send circuit
735: Inbound data queue in send circuit
540: Physical layer
750: Virtualized PHY interface (or: failover circuit)
751: Flit re-encoder
752: Multiplexor
760: Reception circuit
761: Received data queue in reception circuit
765: Salvaged data queue in reception circuit
810: Network interface
820: Network interface
830: Send circuit
850: Virtualized PHY interface (or failover circuit)
851: Flit re-encoder
860: Reception circuit
870: Flit-switched network
871-878: Ring routers
880: Decoder/flit router Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1: A system for transmitting data in a communications network of a high performance computing system, the system including: a source node configured to send a datum; a destination node configured to receive the datum; an intermediate node logically between the source node and the destination node, the intermediate node including: datum encoder logic configured to re-route the datum to the destination node via an alternate node other than the intermediate node.

P2: A method of transmitting computer system data between nodes of a high performance computer system, wherein the data is initially transmitted from a source node of the high performance computer system to a destination node of the high performance computer system on a primary data path over a plurality of links between intermediate nodes in the fabric of the high performance computer system, the method including: detecting an impassable link coupled between a given node of the high performance computer system in the primary data path and a next downstream node in the primary data path; identifying trapped data at the given node; for each flit in the trapped data, salvaging the flit at the given node by re-encoding the flit into a salvaged flit, so that the trapped data is transformed into salvaged data; and sending the salvaged data to the next downstream node in the primary path via an alternate path, the alternate path circumventing the impassable link.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. An intermediate node coupled to a fabric of a high performance computer system, the intermediate node forming part of a primary data path through the fabric between a source node and a destination node, the intermediate node comprising:
    a sending circuit configured to prepare flits for transmission over the fabric;
    a physical layer circuit operably coupled to the fabric, and configured to receive flits from the sending circuit and transmit the flits over the fabric to a downstream node on the primary path;
    a failover circuit operably coupled between the sending circuit and the physical layer circuit, and configured to receive the flits from the sending circuit in response to a failover signal, and redirect the flits to an alternate node in the fabric.

2. The intermediate node of claim 1, wherein the failover circuit comprises a flit re-encoder to receive a trapped flit from the sending circuit and re-encode the trapped flit into a salvaged flit.

3. The intermediate node of claim 2, the intermediate node further comprising a receiver circuit operably coupled to the flit re-encoder to receive the salvaged flit from the flit re-encoder.

4. The intermediate node of claim 3, wherein the receiver circuit further comprises a queue operably coupled to the flit re-encoder to receive the salvaged flit from the flit encoder.

5. The intermediate node of claim 2, wherein the flit re-encoder is operably coupled to a flit switched network to send the salvaged flit over the flit switched network.

6. The intermediate node of claim 2, wherein the re-encoding of the trapped flit into the salvaged flit comprises encoding the trapped flit into a payload field of a second flit, the second flit comprising the salvaged flit.

7. A system for transmitting a flit to a destination node through a fabric in a high performance computer, the system comprising:
- a sending node configured to delete the flit after transmitting the flit across a link to a downstream node in a primary path through the fabric, the flit becoming trapped data if a subsequent link from the downstream node becomes impassable;
- a failover circuit at the downstream node, the failover circuit configured to salvage the trapped data at the downstream node, such that the trapped data is salvaged data; and
- a secondary path through the fabric, the failover circuit configured to send the salvaged data over the secondary path to a subsequent node in the primary path.

8. The system of claim 7, wherein the failover circuit comprises a flit re-encoder to receive a trapped flit and re-encode the trapped flit into a salvaged flit.

9. The system of claim 8, wherein the flit re-encoder is operably coupled to a receiver circuit in the downstream node to send the salvaged flit to the secondary path via the receiver circuit.

10. The system of claim 9, wherein the receiver circuit further comprises a queue operably coupled to the flit re-encoder to receive the salvaged flit from the flit encoder.

11. The system of claim 8, wherein the flit re-encoder is operably coupled to a flit switched network to send the salvaged flit over the flit switched network.

12. The system of claim 7, wherein the sending node comprises a first network interface operably coupled to the primary path through the fabric and a second network interface operably coupled to the secondary path through the fabric.

13. A method of transmitting computer system data between nodes of a high performance computer system, wherein the data is initially transmitted from a source node of the high performance computer system to a destination node of the high performance computer system on a primary data path over a plurality of links between intermediate nodes in the fabric of the high performance computer system, the method comprising:
- detecting an impassable link operably coupled between a given node of the high performance computer system in the primary data path and a downstream node in the primary data path;
- identifying trapped data at the given node;
- for each flit in the trapped data, salvaging the flit at the given node by re-encoding the trapped flit into a salvaged flit; and
- sending the salvaged flit from the given node to the downstream node of the same high performance computer system via an alternate path, the alternate path circumventing the impassable link.

14. The method of claim 13, wherein sending the salvaged flit comprises re-routing the trapped data to the downstream node a subsequent node over an alternate link.

15. The method of claim 14, wherein sending the salvaged flit comprises sending the salvaged flit via a dedicated logic network.

16. The method of claim 14, wherein sending the salvaged flit comprises sending the salvaged flit via a virtual network.

17. The method of claim 14, wherein detecting an impassable link comprises detecting a break in the link coupled between the given node and the downstream node, on which link the trapped data was to have been transmitted to the downstream node.

18. The method of claim 13, wherein the node comprises a physical layer, and the method further comprises providing a virtualized physical interface in the physical layer, the virtualized physical interface configured to re-encode each trapped flit into a salvaged flit.

19. The method of claim 18, wherein the system comprises a packet switched network, and the virtualized physical interface comprises a flit re-encoder to redirect each flit through the system's packet switched network.

20. The method of claim 18, wherein the system comprises a packet switched network and a flit switched network, and the virtualized physical interface comprises a flit re-encoder configured to redirect each flit through the flit switched network.

* * * * *